United States Patent [19]

Vaahs et al.

[11] Patent Number: 4,935,481

[45] Date of Patent: Jun. 19, 1990

[54] POLYSILAZANES, PROCESS FOR THE PREPARATION THEREOF, SILICON NITRIDE-CONTAINING CERAMIC MATERIALS WHICH CAN BE PREPARED THEREFROM, AND THE PREPAATION THEREOF

[75] Inventors: Tilo Vaahs, Kelkheim; Hans-Jerg Kleiner, Kronberg; Marcellus Peuckert; Martin Brück, both of Hofheim am Taunus; Fritz Aldinger, Rodenbach, all of Fed. Rep. of Germany

[73] Assignee: Hoechst Aktiengesellschaft, Frankfurt am Main, Fed. Rep. of Germany

[21] Appl. No.: 266,513

[22] Filed: Nov. 3, 1988

[30] Foreign Application Priority Data

Nov. 7, 1987 [DE] Fed. Rep. of Germany ....... 3737921

[51] Int. Cl.$^5$ .............................................. C08G 77/04
[52] U.S. Cl. ......................................... 528/28; 528/38
[58] Field of Search .................................. 528/28, 38

[56] References Cited

U.S. PATENT DOCUMENTS

| 4,397,828 | 8/1983 | Seyferth et al. | 423/344 |
| 4,482,669 | 11/1984 | Seyferth et al. | 524/442 |
| 4,535,007 | 8/1985 | Cannady | 427/226 |
| 4,540,803 | 9/1985 | Cannady | 556/412 |
| 4,543,344 | 9/1985 | Cannady | 501/92 |
| 4,595,775 | 6/1986 | Arkles | 556/409 |
| 4,725,660 | 2/1988 | Serita et al. | 528/28 |

FOREIGN PATENT DOCUMENTS 2583428 12/1986 France .

OTHER PUBLICATIONS

R. R. Wills et al., *Amer. Ceram. Soc. Bull.*, 62, 904–911, 915 (1983).

S. S. Washburne et al., *J. Organometal. Chem.*, 21, 59–64 (1970).

*Primary Examiner*—Melvyn I. Marquis

[57] ABSTRACT

The invention relates to novel polysilazanes, the preparation thereof, the further processing thereof to form silicon nitride-containing ceramic material, and this material itself. In order to prepare the polysilazanes, dialkylaminoorganyldichlorosilanes of the formula RsiCl$_2$-Nr'R' are reacted with ammonia. The polysilazanes can then be pyrolyzed to form silicon nitride-containing ceramic material. The polysilazanes according to the invention dissolve in customary aprotic solvents.

9 Claims, No Drawings

POLYSILAZANES, PROCESS FOR THE PREPARATION THEREOF, SILICON NITRIDE-CONTAINING CERAMIC MATERIALS WHICH CAN BE PREPARED THEREFROM, AND THE PREPAATION THEREOF

DESCRIPTION

Polysilazanes, process for the preparation thereof, silicon nitride-containing ceramic materials which can be prepared therefrom, and the preparation thereof.

The present invention relates to novel polysilazanes, the preparation thereof, the further processing thereof into silicon nitride-containing ceramic material, and this material itself. The silicon nitride-containing ceramic material is obtained from the polysilazanes by pyrolysis and predominantly comprises silicon nitride containing silicon carbide and carbon components.

The pyrolysis of polysilazanes into silicon nitride/-SiC-containing ceramic material has already been described in the literature (R. R. Wills et al., Ceramic Bulletin, Vol. 62 (1983), 904–915).

In general, the starting materials employed for the preparation of polysilazanes are chlorosilanes, which are reacted with ammonia, primary or secondary amines or with disilazanes (U.S. Pat. Nos. 4,540,803, 4,543,344, 4,535,007, 4,595,775, 4,397,828 and 4,482,669).

A further method of preparing polysilazanes comprises reacting aminosilanes with excess ammonia or excess primary amine. The aminosilanes are themselves prepared by reacting chlorosilanes with amines (FR-No. A1-2,583,423). For example, tetrakis(methylamino)silane $Si(NHCH_3)_4$ is produced from tetrachlorosilane $SiCl_4$ and methylamine:

The aminosilane is subsequently reacted with excess ammonia, all the methylamino groups being replaced by NH groups. Viscous to highly viscous polysilazanes are produced, and can be pyrolyzed to form a silicon nitride-containing material in a ceramic yield of 72–79% by weight.

The disadvantage of this process is the use of large amounts of alkylamine, half of which re-precipitates as alkylamine hydrochloride during the preparation of the aminosilane. The polymers prepared from the aminosilane are viscous and can therefore only be processed with difficulty; fiber production is not possible. The object was therefore to find a simple process which results in solid polysilazanes which are soluble in customary solvents and/or are meltable and can therefore be spun from a solution and/or from the melt. The present invention achieves this object.

The present invention relates to a process for the preparation of polymeric silazanes, which comprises reacting one or more dialkylaminoorganyldichlorosilanes of the formula $RSiCl_2-NR'R'$ in which R is $C_1-C_4$-alkyl, vinyl or phenyl and R' is $C_1-C_4$-alkyl, with at least 3.35 moles of ammonia per mole of silane in a solvent at temperatures from $-80°$ C. to $+70°$ C. R is preferably methyl, ethyl, vinyl or phenyl, and R' is preferably methyl. In particular, R is ethyl and R' is methyl.

The dialkylaminoorganyldichlorosilanes $RSiCl_2-NR'R'$ (also called "aminochlorosilanes" below) employed as starting materials for the polymeric silazanes can be obtained as follows by the method of S. S. Washburne, W. R. Peterson, J. Organometal. Chem. 21 (1970), page 59:

One or more organyltrichlorosilanes $RSiCl_3$ where R represents an alkyl group having 1 to 4 carbon atoms, vinyl or phenyl, are reacted with dialkylamine $HNR'R'$ where R' represents alkyl groups having 1 to 4 carbon atoms. The reaction is carried out in aprotic solvents, preferably polar solvents such as ethers, in particular in THF.

The molar ratio between the organyltrichlorosilane and the dialkylamine may adopt values between 1:1 and 1:3, but a ratio of about 1:2 is preferred.

The ammonium salts produced during the reaction precipitate out of the reaction solution while the aminochlorosilanes formed remain in the solution.

Each mole of the aminochlorosilanes of the formula $RSiCl_2-NR'R'$ obtained is reacted, according to the invention, with at least 3.35 moles, preferably with at least 3.5 moles, of ammonia in aprotic solvents, preferably polar solvents such as ethers, in particular THF. This is carried out at temperatures between $-80°$ C. and $+70°$ C., preferably at $-10°$ C. to $0°$ C. In this reaction, an ammonia molecule firstly reacts with two SiCl functions to form an NH bridge between the two silicon atoms:

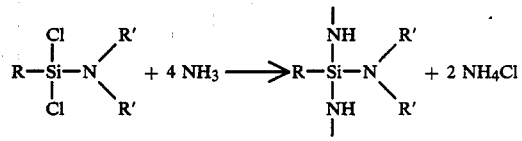

Oligomeric units are thereby formed. Surprisingly, partial displacement of the dialkylamino groups from the silicon atom subsequently takes place, with a novel class of crosslinked polymeric silazanes being produced. In this case, the terminal dialkylamino groups are replaced by NH bridges, forming an additional crosslinking:

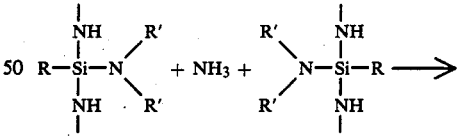

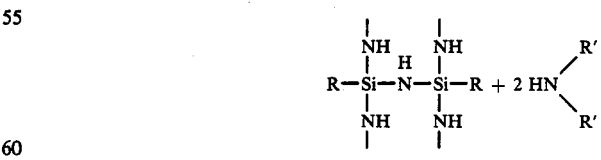

As stated, however, not all the dialkylamino groups are displaced; some of them remain bound to silicon atoms and are thus present in the polymeric silazane.

The novel polymeric silazanes produced are fully soluble in all customary aprotic solvents. They contain the following structural units:

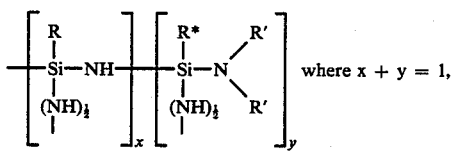

where, although the same radicals as for R are suitable for R*, R and R* may, however, be identical or different (different if more than one aminochlorosilane is reacted with $NH_3$).

Si here is never connected directly to Si, but always via an NH bridge. If, for example, $x=0.9$ (and thus $y=0.1$), 10% of the dialkylamino groups originally present are retained in the polymer, and 90% of the silicon atoms are tri-crosslinked via NH bridges. The controllable ratio between x and y determines the degree of crosslinking and thus the viscosity and processability to the ceramic.

Values of $x=0.7-0.95$ ($y=0.3-0.05$) are obtained here when at least 3.35 moles of $NH_3$ are used per mole of aminochlorosilane. Preferably, $x=0.85-0.95$ ($y=0.15-0.05$), which is the case when at least 3.5 moles of $NH_3$ are used per mole of aminochlorosilane. In general, a maximum of 8 moles, preferably a maximum of 6 moles, of $NH_3$ are used per mole of aminochlorosilane. An amount of $NH_3$ greater than 8 moles is naturally also successful, but this greater expense is unnecessary.

Accordingly, the present invention furthermore relates to polymeric silazanes of the general formula

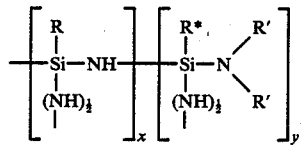

in which R and R* may be identical or different and R and R* are $C_1$–$C_4$-alkyl, vinyl or phenyl, R' is $C_1$–$C_4$-alkyl, and x and y denote the molar fractions of the two structural units, where $x+y=1$ and $x=0.7-0.95$. In this formula, R and R* are again preferably methyl, ethyl, vinyl or phenyl and R' is preferably methyl; R and R* are particularly preferably ethyl and R' is particularly preferably methyl.

The present invention furthermore relates to polymeric silazanes which can be obtained by reacting one or more dialkylaminoorganyldichlorosilanes of the formula $RSiCl_2$—$NR'R'$ in which R is $C_1$–$C_4$-alkyl, vinyl or phenyl and R' is $C_1$–$C_4$-alkyl, with at least 3.35 moles of ammonia per mole of silane in a solvent at temperatures from $-80°$ C. to $+70°$ C.

The structural formula of the polymeric silazanes according to the invention shows that their relative content of nitrogen is necessarily high: the silicon:nitrogen ratio has values between 1:1.3 and 1:2. In $Si_3N_4$, this ratio is 1:1.33, which means that the correct silicon:nitrogen ratio for the silicon nitride ceramic can easily be produced by eliminating ammonia on pyrolysis of the polysilazanes.

This prevents formation of elemental silicon on the pyrolysis. This is a considerable problem in the process described by D. Seyferth, G. H. Wiseman and C. Prud'-homme (U.S. Pat. No. 4,397,828, J. Amer. Ceram. Soc. 66 (1983) C 13), which precedes from dichlorosilane $H_2SiCl_2$ and ammonia to form a polysilazane having an Si:N ratio of 1:1. On pyrolysis of polysilazanes of this type, α- and β-$Si_3N_4$ are produced, and the excess silicon in the polysilazane appears in the ceramic as elemental silicon.

The nitrogen-rich polysilazanes according to the invention can be converted, by pyrolysis, into amorphous, dense materials which contain silicon nitride and may also contain traces of H and 0.

The present invention therefore also relates to a process for the preparation of silicon nitride-containing ceramic material, which comprises pyrolyzing the polymeric silazanes defined above by means of their structural formula or by means of the process for their preparation, in an inert atmosphere at 800° to 1400° C. The inert atmosphere here may comprise $N_2$, Ar or He, but $N_2$ or Ar is preferably used. At pyrolysis temperatures above 1200° C., such as in the range of 1200° C. to 1400° C., partly amorphous, microcrystalline ceramic materials are produced which contain α-$Si_3N_4$ as a crystalline phase.

A particular advantage is that, before pyrolysis, the polysilazanes can be shaped, by various methods, into three-dimensional shaped articles. The simplest method of shaping is pressing (uniaxial or isostatic pressing) described in Examples 1, 2 and 3. Other shaping methods, such as slip casting, extrusion etc., are likewise possible.

An important method of shaping is the drawing of fibers from the polysilazanes. In this method, fibers can be drawn from highly viscous solutions of polysilazane in solvents such as toluene, tetrahydrofuran or hexane; in the case where R and R* are ethyl, R' is methyl and $x=0.85$ to 0.95, it is also possible to draw fibers from viscous melts of the polysilazane, in addition to from solutions. Fiber drawing is advantageously carried out using spinnerets 80 to 150 μm in diameter. The fiber is tapered by subsequent stretching, so that a very strong fiber 2 to 20 μm, in particular 5–15 μm, in diameter is produced after pyrolysis. If spinning is carried out from a solution, the fiber is initially dried in air or an inert gas after stretching. If spinning is carried out from the melt, with the melt temperature generally being 60° to 150° C., the fiber is briefly crosslinked further in air or ammonia at room temperature after stretching so that it does not break up on subsequent pyrolysis. The fibers produced by subsequent pyrolysis are used as mechanical reinforcement inclusions in fiber-reinforced aluminum, aluminum alloys and ceramic components.

A further important way of processing the polysilazanes according to the invention is the production of impermeable highly adhesive, amorphous or microcrystalline ceramic coatings on metals, in particular steels, or on ceramics such as $Al_2O_3$, $ZrO_2$, MgO, SiC or silicon nitride. The coating is effected with the aid of a solution of the polysilazane in organic solvents such as toluene, tetrahydrofuran or hexane. If R and R* are ethyl, R' is methyl and $x=0.85$ to 0.95, the polysilazane can be melted, and coating can therefore take place both by means of a solution of the polysilazane and by means of a melt by dipping the article to be coated. Pyrolytic conversion into an amorphous or microcrystalline layer takes place in the same temperature range from 800° to 1200° C., or 1200° C. to 1400° C., under an inert gas, as described for three-dimensional shaped articles.

Due to their excellent adhesion, great hardness and high surface quality, these ceramic coatings are particularly suitable for surface finishing of machine components which are subject to mechanical load and chemical attack.

The meltable polysilazanes where R and R* are ethyl, R' is methyl and $x=0.85-0.95$ can also be melted and then cast in any desired casting dies. Due to the high ceramic yield of 70 to 90% by weight, these castings can be converted into amorphous, microcrystalline or crystalline ceramic shaped articles which are virtually free of cracks and pores by pyrolysis using a very slow temperature-increase program.

In addition, the polysilazanes according to the invention can also be pyrolyzed in an $NH_3$ atmosphere instead of in an inert gas at an equally high ceramic yield of 70–90% by weight. In this case, a glass-clear, colorless material which is virtually free of carbon is produced. In the case of pyrolysis in $NH_3$ at 1000° C. or higher, the carbon content is less than 0.5% by weight. Depending on the pyrolysis temperature, the pyrolysis product comprises virtually pure amorphous silicon nitride (pyrolysis at less than 1200° C.) or crystalline silicon nitride (pyrolysis at above 1250° C., preferably at above 1300° C.).

Pyrolysis in $NH_3$ can be used for all shaped articles produced by the above-described shaping methods, i.e. for articles, fibers, coatings and castings shaped from polysilazane.

The polysilazanes described can also be mixed with other ceramic powders, such as, for example, $Al_2O_3$, BN, SiC or $Si_3N_4$, further processed together with the latter and finally sintered. In this case, novel composite materials having improved mechanical, thermal or chemical properties are produced.

EXAMPLE 1

30 ml (37.3 g; 0.25 mol) of methyltrichlorosilane $H_3CSiCl_3$ were dissolved in 600 ml of dry THF under a nitrogen atmosphere in a 1-liter three-neck flask fitted with cold finger and stirrer. The cold finger was cooled to $-78°$ C. (dry ice), and the solution was cooled to $-10°$ C. using a cooling bath. 31.7 ml (23 g; 0.51 mol) of dimethylamine $(H_3C)_2NH$ were passed into this solution while stirring at a rate such that the internal temperature did not exceed 5° C. During this operation, dimethylammonium chloride $(H_3C)_2NH_2Cl$ precipitated out. 33 ml (25.5 g; 1.5 mol) of ammonia were subsequently passed into the resultant solution of dimethylaminodichloromethylsilane $H_3CSiCl_2$—$N(CH_3)_2$ at a rate such that the internal temperature did not exceed $-5°$ C. The cooling bath was subsequently removed, and the reaction mixture was warmed to room temperature ($+20°$ C.). The mixture was stirred at this temperature for one hour. The precipitated ammonium chloride $NH_4Cl$ and the dimethylammonium chloride $(H_3C)_2$—$NH_2Cl$ were filtered off under nitrogen. The solvent and all the volatile components of the filtrate were removed by distillation at reduced pressure at room temperature. During this operation, the viscosity increased greatly, and a colorless solid began to form.

During drying using a vacuum pump, this residue foamed up and became dry and solid. The polysilazane obtained then no longer contained solvent. The $^1H$ NMR in $CDCl_3$ exhibited the Si methyl, NH and N-methyl resonances having the intensities 3:1.45:0.6 in each case as a broad group of signals. The polysilazane dissolved in customary aprotic solvents.

The analytical results showed a Si:N ratio of 1:1.37. The polysilazane obtained was pressed at 3000 bar to form a porous body measuring $10\times10\times10$ $mm^3$ and pyrolyzed for one hour at 1000° C. under nitrogen. A black ceramic body was obtained which exhibited a weight loss of 30% by weight, compared with the substance employed, i.e. the ceramic yield was 70% by weight.

EXAMPLE 2

50 ml (63.0 g; 0.39 mol) of vinyltrichlorosilane were dissolved in 600 ml of THF under a nitrogen atmosphere in a 1-liter three-neck flask fitted with cold finger and stirrer. The cold finger was cooled to $-78°$ C. (dry ice) and the reaction solution to $-10°$ C. 49 ml (35.1 g; 0.78 mol) of dimethylamine $(H_3C)_2NH$ were subsequently passed into the solution at a rate such that the temperature did not exceed 0° C. During this operation, dimethylammonium hydrochloride $(H_3C)_2NH_2Cl$ was formed and precipitated out. When all the dimethylamine had been passed in, the mixture was warmed to room temperature ($+20°$ C.) and the white precipitate was filtered off. The filtrate was freed from solvent, and the residue was worked up by distillation. 33.5 g of vinyl(dimethylamino)dichlorosilane distilled over at 138° C. and 1 bar as a clear, readily mobile liquid. The $^1H$ NMR spectrum exhibited a ABX spin system for the vinyl group at $\delta=6.2$ ppm (intensity 1) and a singlet for the dimethylamino group at $\delta=2.58$ ppm (intensity 2).

The 33.7 g (0.21 mol) of vinyl(dimethylamino)dichlorosilane obtained were dissolved in 500 ml of dry THF under a nitrogen atmosphere in a 1 liter three-neck flask fitted with cold finger and stirrer.

The solution was cooled to $-10°$ C. and the cold finger to $-78°$ C. (dry ice). 28 ml (21.6 g; 1.27 mol) of ammonia were passed into the solution at a rate such that the internal temperature did not exceed $-5°$ C. When the reaction was complete, the mixture was warmed to 20° C., and the precipitated ammonium chloride was filtered off. The solvent was subsequently removed from the filtrate by distillation under reduced pressure at 20° C., and a viscous residue remained which became solid and dry on drying using a vacuum pump (12 g). This residue was fully soluble in customary aprotic solvents. The $^1H$ NMR in $CDCl_3$ exhibited resonances for the vinyl, NH and $N(CH_3)_2$ groups in the ratio 3:1.45:0.6. The vinyl group appeared between 5.5 and 6.5 ppm as a broad group of signals, and NH between 0.5 and 1.5 ppm and $N(CH_3)_2$ at 2.3–2.7 ppm. The elemental analysis showed a Si:N ratio of 1:1.55.

A body measuring $10\times10\times10$ $mm^3$ was pressed from this polysilazane at 3000 bar and pyrolyzed for one hour at 1000° C. under nitrogen. An amorphous ceramic body whose weight corresponded to a ceramic yield of 86% by weight was thus obtained.

EXAMPLE 3

35 ml (42.5 g; 0.26 mol) of ethyltrichlorosilane were dissolved in 600 ml of dry tetrahydrofuran under a nitrogen atmosphere in a 1-liter three-neck flask fitted with cold finger and stirrer. The cold finger was cooled to $-78°$ C. (dry ice) and the solution to $-10°$ C. 31 ml (23.8 g; 0.53 mol) of dimethylamine $HN(CH_3)_2$ were then passed into the solution at a rate such that the internal temperature did not exceed $-5°$ C. 17.5 ml (13.5 g; 0.79 mol) of ammonia were subsequently passed into the resultant solution of dimethylaminodichloroethylsilane $C_2H_5SiCl_2$—$N(CH_3)_2$. The mixture was then warmed to room temperature, and the ammonium salts precipitated were separated off. The solvent was removed by distillation at reduced pressure at 20° C. A soft solid remained. On warming, the substance became increasingly liquid in a constant process. The silicon:nitrogen ratio was 1:1.4. The polysilazane dissolved fully in customary aprotic solvents.

In the $^1$H NMR spectrum, all the resonance lines for the Si-ethyl and Si—NH groups were present as an unstructured broad signal between $\delta=0.1$ and $\delta=1.6$ ppm. The N-methyl group appeared at $\delta=2.5$ ppm.

On warming the polysilazane at $+80°$ C., it was possible to draw fibers from the melt, and these fibers were exposed to atmospheric air for one hour at room temperature. This caused the fibers to become unmeltable, and they retained their shape on pyrolysis.

EXAMPLE 4

15 ml (18.6 g/0.11 mol) of ethyltrichlorosilane and 45 ml (57.1g/0.35 mol) of vinyltrichlorosilane were mixed and dissolved in 700 ml of dry THF in a 1-liter three-neck flask fitted with cold finger and stirrer. The cold finger was cooled to $-78°$ C. and the solution to $-10°$ to 0° C. 41.9 g (0.93 mol) of dimethylamine were subsequently added at a rate such that the internal temperature did not exceed $+10°$ C.

31.6 g (1.87 mol) of ammonia were then added. When the reaction was complete, the ammonium chloride and the dimethylamine hydrochloride were separated off.

All the volatile components were removed by distillation at reduced pressure at 20° C. A viscous residue remained (26.1 g). In the $^1$H NMR spectrum in CDCl$_3$, the resonances for the vinyl groups appeared between $\delta=5.5-6.5$ ppm, for the dimethylamino groups between $\delta=2.3-2.5$ ppm and for the ethyl and NH groups between $\delta=0.2-1.3$ ppm. The relative intensities were 15:1.7:18 in the above-mentioned sequence.

The substance became more mobile at elevated temperature and it was possible to draw off tacky fibers.

The ceramic yield on pyrolysis in argon was 76% by weight.

EXAMPLE 5

25 ml (31.6 g/0.19 mol) of vinyltrichlorosilane and 25.1 ml (31.1 g/0.19 mol) of ethyltrichlorosilane were mixed and dissolved in 700 ml of dry THF in a 1-liter three-neck flask fitted with cold finger and stirrer. The cold finger was cooled to $-78°$ C. and the solution to $-10°$ to 0° C. 34.1 g (0.76 mol) of dimethylamine were subsequently added at a rate such that the internal temperature did not exceed $+10°$ C.

25.9 g (1.52 mol) of ammonia were then added. When the reaction was complete, the ammonium chloride and the dimethylamine hydrochloride were separated off.

All the volatile components were removed by distillation at reduced pressure at 20° C. A very viscous residue (22.2 g), which became more mobile on increasing the temperature, remained.

In the $^1$H NMR spectrum in CDCl$_3$, the signals for the vinyl groups appeared between $\delta=5.5-6.5$ ppm, for the dimethylamino groups between $\delta=2.3-2.6$ ppm and for the ethyl and NH groups between $\delta=0.2-1.5$ ppm. The relative intensities were 7:1.5:17.7 in the above-mentioned sequence.

It was possible to draw tacky fibers at $+50°$ C.

The ceramic yield on pyrolysis in argon was 74% by weight.

We claim:

1. A process for the preparation of polymeric silazanes, which comprises reacting one or more dialkylaminoorganyldichlorosilanes of the formula RSiCl$_2$—NR'R', in which
   R is C$_1$-C$_4$-alkyl, vinyl or phenyl, and
   R' is C$_1$-C$_4$-alkyl,
with at least 3.35 moles of ammonia per mole of silane in a solvent at temperatures from $-80°$ C. to $+70°$ C.

2. The process as claimed in claim 1, wherein R is methyl, ethyl, vinyl or phenyl, and R' is methyl.

3. The process as claimed in claim 1, wherein R is ethyl and R' is methyl.

4. The process as claimed in claim 1, wherein at least 3.5 moles of ammonia are used per mole of dialkylaminoorganyldichlorosilane.

5. A polymeric silazane of the formula

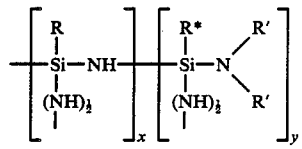

in which R and R* may be identical or different and R and R* are C$_1$-C$_4$-alkyl, vinyl or phenyl, R' is C$_1$-C$_4$-alkyl, and x and y denote the molar fractions of the two structural units, where $x+y=1$ and $x=0.7-0.95$ and wherein each (NH)$_\frac{1}{2}$ denotes a single NH group linked to the Si atom and a second Si atom.

6. A polymeric silazane as claimed in claim 5, wherein, independently of one another, R and R* are methyl, ethyl, vinyl or phenyl, and R' is methyl.

7. A polymeric silazane as claimed in claim 5, wherein R and R* are ethyl and R' is methyl.

8. A polymeric silazane as claimed in claim 5, wherein $x=0.85-0.95$.

9. A polymeric silazane, which is obtained by the process as claimed in claim 1.

* * * * *